(12) United States Patent
Choi

(10) Patent No.: US 8,403,370 B2
(45) Date of Patent: Mar. 26, 2013

(54) PIPE COUPLING DEVICE

(76) Inventor: Yuk Nam Choi, Bucheon-si (KR)

( * ) Notice: Subject to any disclaimer, the term of this patent is extended or adjusted under 35 U.S.C. 154(b) by 155 days.

(21) Appl. No.: 12/970,372

(22) Filed: Dec. 16, 2010

(65) Prior Publication Data

US 2011/0148093 A1 Jun. 23, 2011

(30) Foreign Application Priority Data

Dec. 17, 2009 (KR) .................... 20-2009-0016505 U
Jun. 7, 2010 (KR) .................... 20-2010-0005946 U

(51) Int. Cl.
*F16L 21/06* (2006.01)

(52) U.S. Cl. .......... 285/322; 285/324; 285/243; 285/93; 137/862; 137/887

(58) Field of Classification Search .................. 285/322, 285/324, 243, 92, 93; 137/864, 861, 862, 137/887
See application file for complete search history.

(56) References Cited

U.S. PATENT DOCUMENTS

| 2,018,543 | A | * | 10/1935 | Buirk | 137/887 |
| 3,998,242 | A | * | 12/1976 | Goldman et al. | 137/862 |
| 5,293,903 | A | * | 3/1994 | Appelwick | 137/887 |
| 5,605,360 | A | * | 2/1997 | Kurisaki et al. | 285/322 |
| 6,056,326 | A | * | 5/2000 | Guest | 285/322 |
| 6,688,651 | B2 | * | 2/2004 | Min-cheol | 285/92 |
| 7,410,193 | B2 | * | 8/2008 | Guest | 285/322 |
| 7,425,022 | B2 | * | 9/2008 | Guest | 285/322 |
| 7,543,858 | B1 | * | 6/2009 | Wang | 285/322 |
| 7,600,536 | B1 | * | 10/2009 | Steininger | 137/887 |

* cited by examiner

*Primary Examiner* — David E Bochna
(74) *Attorney, Agent, or Firm* — Sughrue Mion, PLLC

(57) ABSTRACT

A pipe coupling device includes a body part, fastening parts, and pressurizing parts. The body part has a multi-stepped insertion hole penetrating the central portion thereof, a stepped latching portion formed on the inner circumference of the insertion hole, and first projections continuously formed on the upper surfaces of the externally threaded portions. Each of the fastening parts has an internally threaded portion formed on the inner circumference thereof and is screwed onto the externally threaded portion, a coupling hole penetrating the central portion thereof so as to be in communication with the insertion hole, a first inclined plane formed around the boundary between the internally threaded portion and the insertion hole. Each of the pressurizing parts has a stepped foot portion formed on the outer circumference of one side thereof.

7 Claims, 14 Drawing Sheets

PIPE COUPLING DEVICE

BACKGROUND OF THE INVENTION

1. Field of the Invention

The present invention relates to a pipe coupling device, and more specifically to a pipe coupling device that joins and connects pipes from which corroded or damaged portions are cut out.

2. Description of the Related Art

Piping work is generally carried out by cutting a plurality of pipes having various lengths and connecting the cut pipes together to form pipelines according to installation environments. Pipe coupling devices are used for the limited length of pipes and the necessity to change the position of pipelines during piping work.

Main applications of pipes are water supply and drainage lines for the transport of water and hydraulic lines for the transport of fluids such as oil. In addition, pipes are used to transport gases and various raw materials such as powders.

When it is intended to produce a long transport line, a number of coupling sites are required in the middle of the transport line due to the limited length of pipes. Coupling structures capable of maintaining hermetic sealing of the transport line are also required at the coupling sites to prevent leakage from the transport line.

In many cases, pipes tend to corrode by impurities settled therein or are damaged by external impact. In serious cases, it is necessary to remove the corroded or damaged portions from the pipes by cutting. Pipe coupling devices are often used to connect the pipes after cutting.

A pipe coupling device having a length of 6 cm to 7 cm is currently used to connect pipes from which portions having a width of 2-3 cm are cut out.

FIG. 1 proposes a prior art pipe coupling device. In the pipe coupling device, internally threaded portions are formed at both ends of a joint pipe 6, an inclined plane 10 extends from each of the internally threaded portions toward the central portion of the inner circumferential surface, a packing member 5 and a washer 4 are inserted into each of the inclined planes 10, and fixing bolts 3c are screwed into the joint pipe 6 to connect pipes 1. A central portion 13, a parallel threaded portion 11 extending from one side of the central portion 13 and a tapered threaded portion 12 extending from the other side of the central portion 13 form the outer circumferential surface of the fixing bolt 3. The central portion 13 is polyhedral, which enables the use of a suitable tool. When the parallel threaded portion 11 is screwed into the joint pipe 6, the packing member 5 is pressurized and fitted between the inner circumferential surface of the joint pipe 6 and the outer circumferential surface of the pipe 1 to maintain hermetic sealing of the pipes 1. A plurality of cut-away portions 7 are formed in the axial direction. When the inner circumferential surface of the tapered threaded portion 12 having an outer circumferential surface, whose outer diameter decreases toward the front portion, formed with a tapered screw is screwed into a tightening nut 2, the inner circumferential surface of the tapered threaded portion 12 is curved toward the outer circumferential surface of the pipe 1 and is fixedly secured to the pipe 1.

However, the prior art pipe coupling device connects pipes from which only portions containing settled impurities are cut out within a length range without departing from an allowable tolerance range of a currently available pipe coupling device. Thus, the periphery of the settled portions is liable to corrode.

It is difficult to connect pipes from which only small portions are cut out because pipes inserted into both ends of the pipe coupling device have the same insertion depth.

Further, in the case where the insertion depths of pipes inserted into both ends of the pipe coupling device are not exactly known, asymmetric insertion lengths of the pipes cause poor hermetic sealing, leading to water leakage.

Further, coupling errors may occur because the time when the coupling is finished is unknown.

The use of metal materials in order to improve the heat resistance and strength of the coupled portions entails considerable manufacturing costs.

SUMMARY OF THE INVENTION

It is an object of the present invention to provide a pipe coupling device that provides a sufficient coupling depth to connect pipes, from which even slightly corroded portions are removed, so that the pipes can be connected to each other in a state in which corroded portions are completely removed from the pipes.

It is another object of the present invention to provide a pipe coupling device that provides different insertion depths to connect pipes, from which corroded or damaged portions are cut out, so that the pipes can be connected to each other even when only small portions are cut out from the pipes.

It is another object of the present invention to provide a pipe coupling device that allows a worker to conceive the insertion depths of pipes by tactile sensation to make the insertion lengths of the pipes symmetric.

It is another object of the present invention to provide a pipe coupling device that indicates the time when the fastening of fastening parts is finished to prevent the occurrence of errors when fastening.

It is another object of the present invention to provide a pipe coupling device that includes a body part and a branch part coupled to the body part to allow for selective coupling of a branch pipe, so that a flow of fluid can be freely branched or blocked.

It is still another object of the present invention to provide a pipe coupling device that uses cheap materials comparable to metals in terms of durability and heat resistance to prevent fastening parts from decoupling by internal and external factors.

In order to accomplish the above objects, there is provided a pipe coupling device including a body part, fastening parts, and pressurizing parts wherein the body part has a multi-stepped insertion hole penetrating the central portion thereof, a stepped latching portion formed on the inner circumference of the insertion hole to limit the insertion depths of pipes, externally threaded portions formed on the outer circumference of both ends thereof, and first projections continuously formed on the upper surfaces of the externally threaded portions; each of the fastening parts has an internally threaded portion formed on the inner circumference thereof and is screwed onto the externally threaded portion, a coupling hole penetrating the central portion thereof so as to be in communication with the insertion hole, a first inclined plane formed around the boundary between the internally threaded portion and the insertion hole, and second projections continuously formed on the lower surface of the first inclined plane to pressurize the first projections and to be engaged with the first projections when the fastening part is fastened to the body part; and each of the pressurizing parts has a stepped foot portion formed on the outer circumference of one side thereof so as to be introduced into the coupling hole, a pressurizing piece integrated with the stepped foot portion, a stepped latching portion formed on the outer circumference of the other side thereof, cut-away grooves formed on the outer circumferential surface of the pressurizing piece to elastically widen the pressurizing piece, and a pressurizing space formed in the central portion thereof, so that the first inclined plane of the fastening part fastened to the body part pressurizes the outer circumferential surface of the stepped latching portion, or the outer circumference of the stepped latching portion is moved inward along the first inclined plane and the pressurizing piece shrinks inward to pressurize the outer circumference of the pipe inserted into the pressurizing space when the pipe inserted into the pressurizing space is withdrawn.

In an embodiment, the stepped latching portion is located with different depths from both ends of the insertion hole.

In an embodiment, the body part further has identification protrusions formed on the inner circumference of the insertion hole and stopping the ends of the pipes to identify the insertion depths of the pipes.

In an embodiment, the identification protrusions are formed radially on the inner circumference of the insertion hole and increase in height as they approach the central portion of the body part.

In an embodiment, the identification protrusions are formed on the inner circumference of the insertion hole and extend in the lengthwise direction of the body part so that latching grooves formed on the outer circumference of the pipe are latched by the identification protrusions upon rotation.

In an embodiment, the first projections and the second projections are formed like saw-teeth symmetrically to each other.

In an embodiment, the pipe coupling device further includes a branch part integrated with the body part on the outer circumference of the body part wherein the branch part includes: a branch member having an introduction hole uprightly communicating with the insertion hole, and a branch hole vertically communicating with the introduction hole and being opened upward; connection means integrated with the branch member at the lateral side of the branch member and in communication with the introduction hole; and a branch valve turnably accommodated in the branch member to branch or block a flow of fluid into the connection means through the insertion hole depending on the turning angle thereof.

In an embodiment, the connection means includes: a connection member having a through-hole penetrating the central portion thereof while being in communication with the introduction hole; a cover having a coupling hole penetrating the central portion thereof and a third inclined plane formed on the inner circumference thereof; and a pressurizing part having a stepped foot portion formed on the outer circumference of one side thereof so as to be partially introduced into the coupling hole, a pressurizing piece formed integrally with the stepped foot portion, a stepped latching portion formed on the outer circumference of the other side thereof, a plurality of cut-away grooves formed on the outer circumferential surface of the pressurizing piece to elastically widen the pressurizing piece, and a pressurizing space formed in the central portion thereof, so that when the third inclined plane of the cover fastened to the connection member pressurizes the outer circumferential surface of the stepped latching portion, the pressurizing piece shrinks inward to pressurize the outer circumference of a branch pipe inserted into the pressurizing space, and the branch valve includes a flange turnably accommodated in the branch hole and allowing the insertion hole to be in communication with the connection means depending on the turning angle of a transversely penetrating drainage hole; and a switch coupled to the upper end of the turnable flange to manipulate the turnable flange.

In an embodiment, the fastening parts are made of at least one polymer selected from the group consisting of polyamide, polyester, polycarbonate, polybutylene terephthalate (PBT), and polyphenylene oxide (PPO).

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
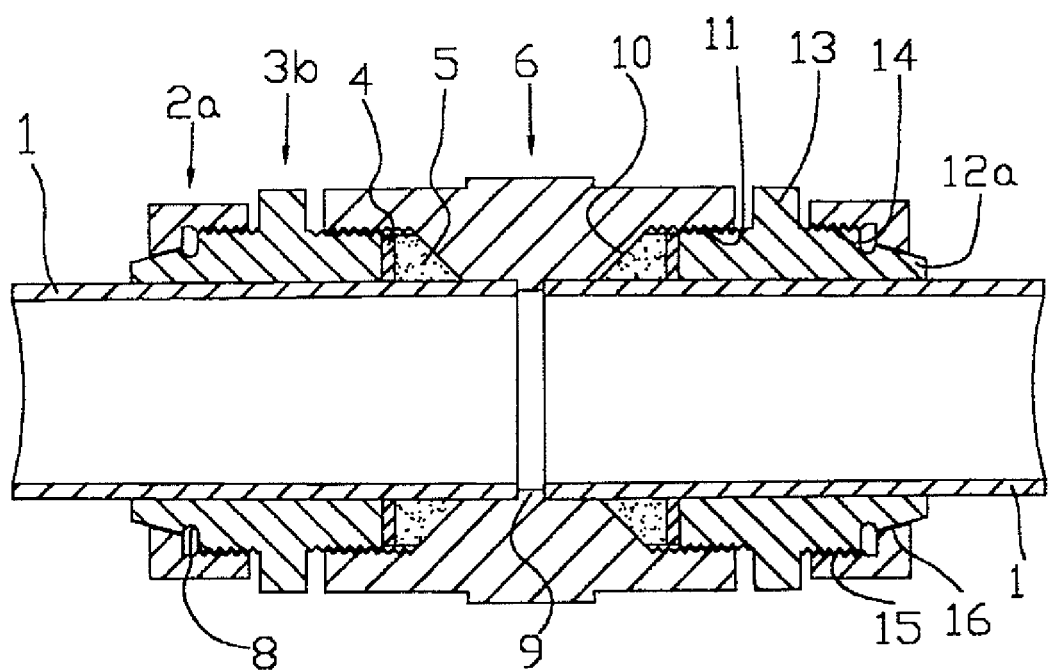
FIG. 1 is a perspective view illustrating a pipe coupling device according to the prior art.

It should be noted that whenever possible, the same reference numerals will be used throughout the drawings and the description to refer to the same or like parts. In describing the present invention, detailed descriptions of related known functions or configurations are omitted in order to avoid making the essential subject of the invention unclear.

Figure 2:
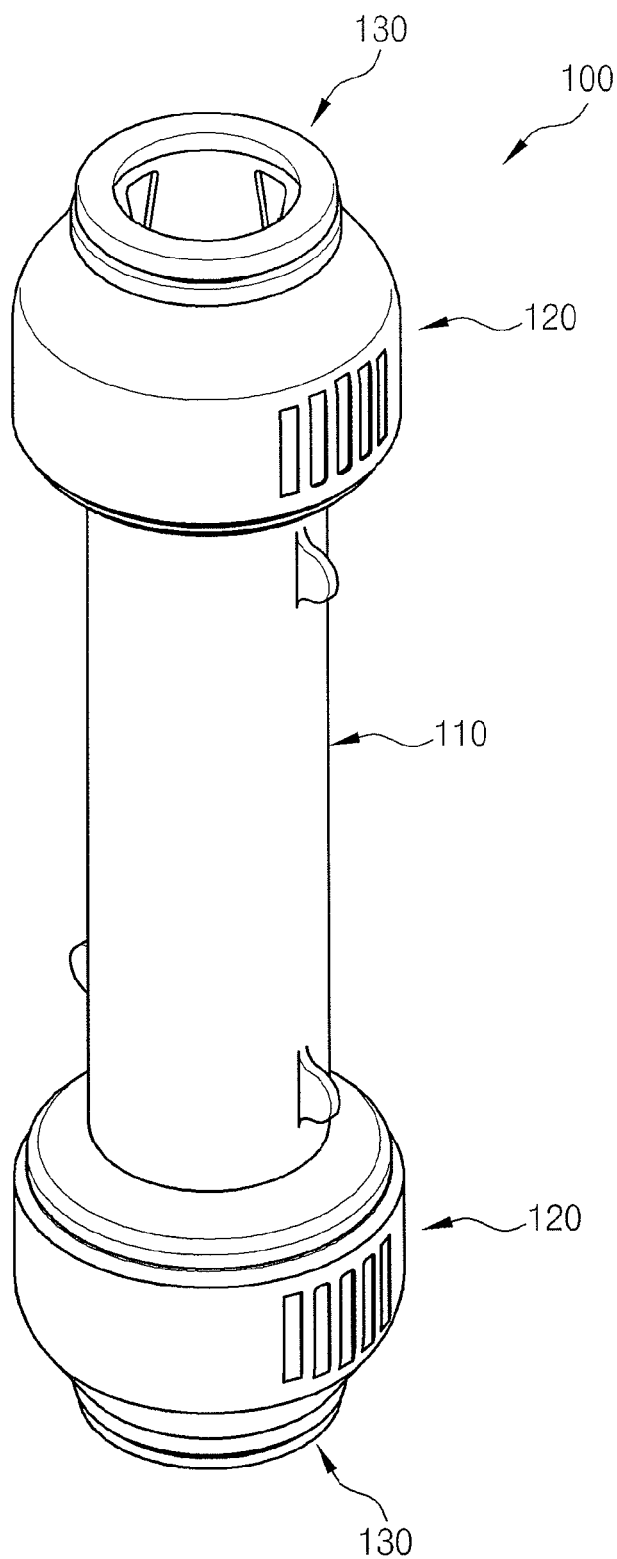
FIG. 2 is an assembled perspective view illustrating a pipe coupling device according to an embodiment of the present invention.
Figure 3:
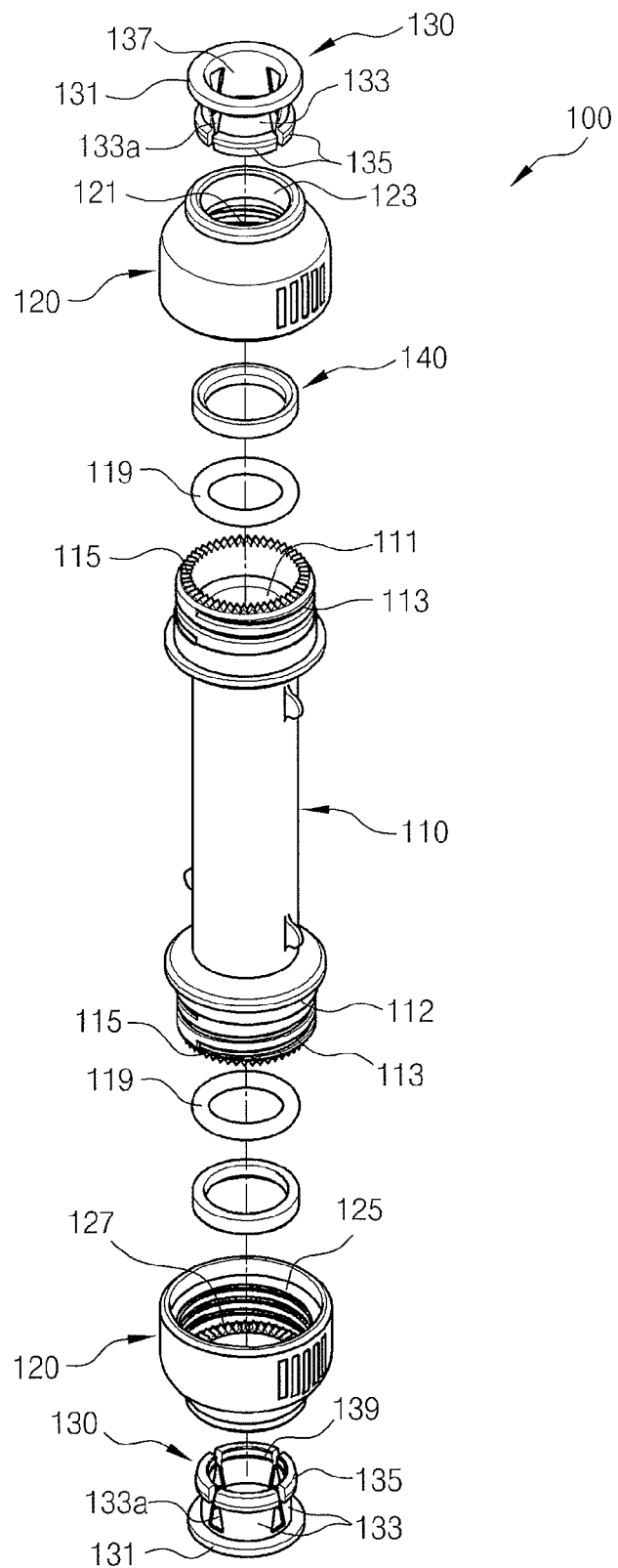
FIG. 3 is an exploded perspective view illustrating the pipe coupling device of FIG. 2.
Figure 4:
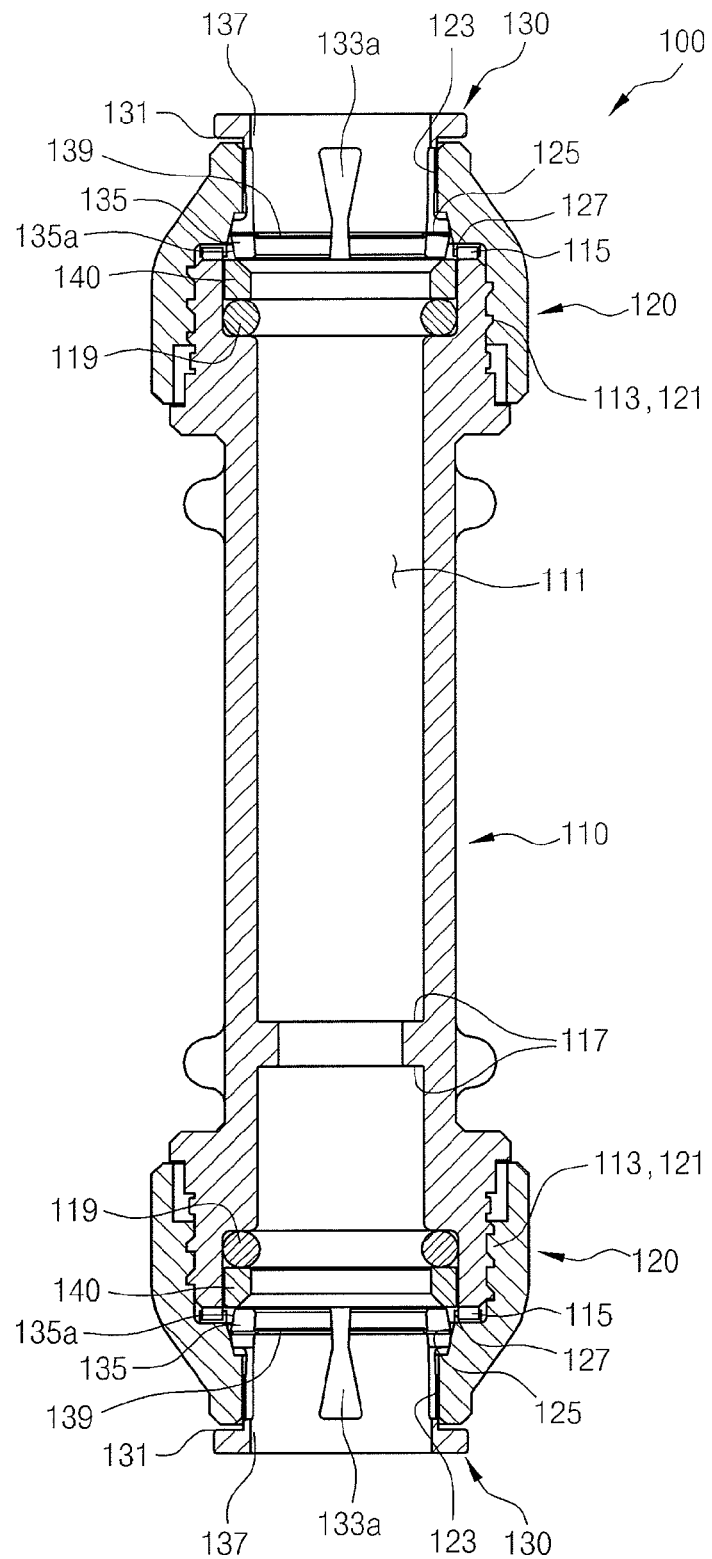
FIGS. 4 and 5 are cross-sectional views illustrating pipe coupling devices according to embodiments of the present invention.
Figure 5:
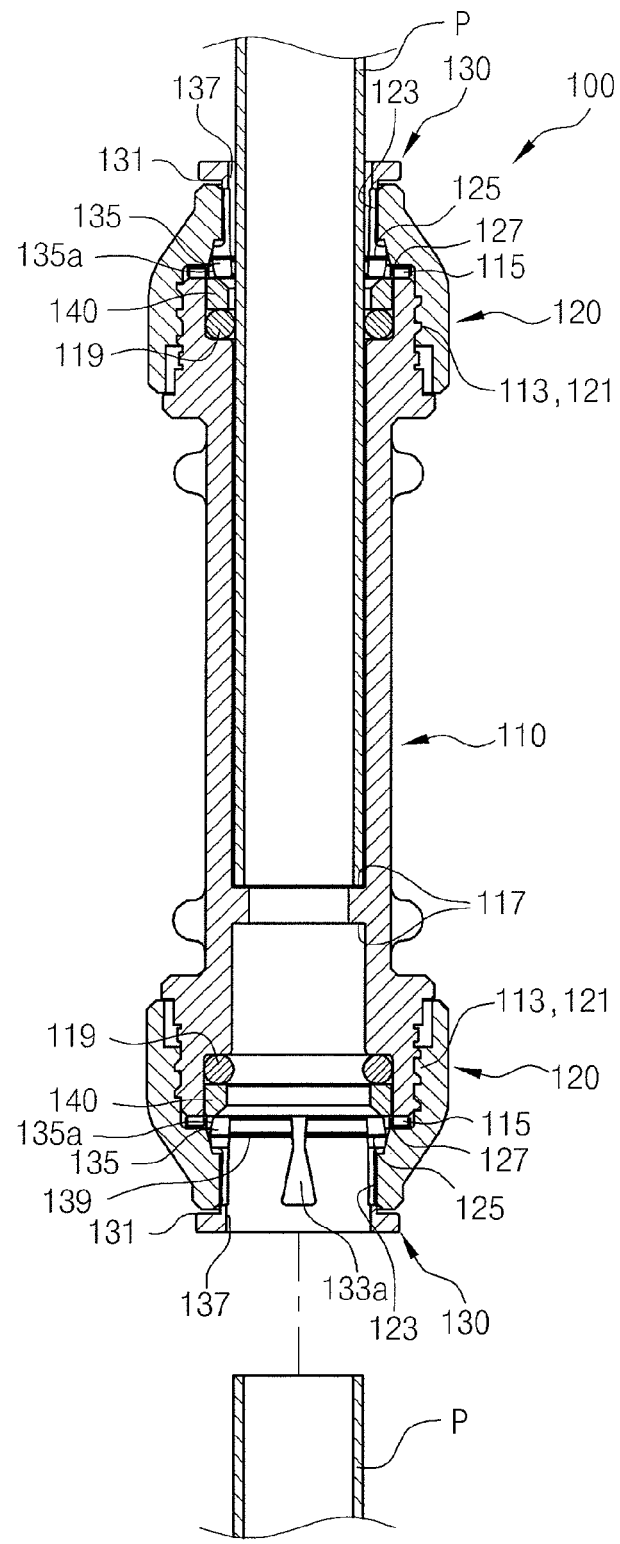
Figure 6:
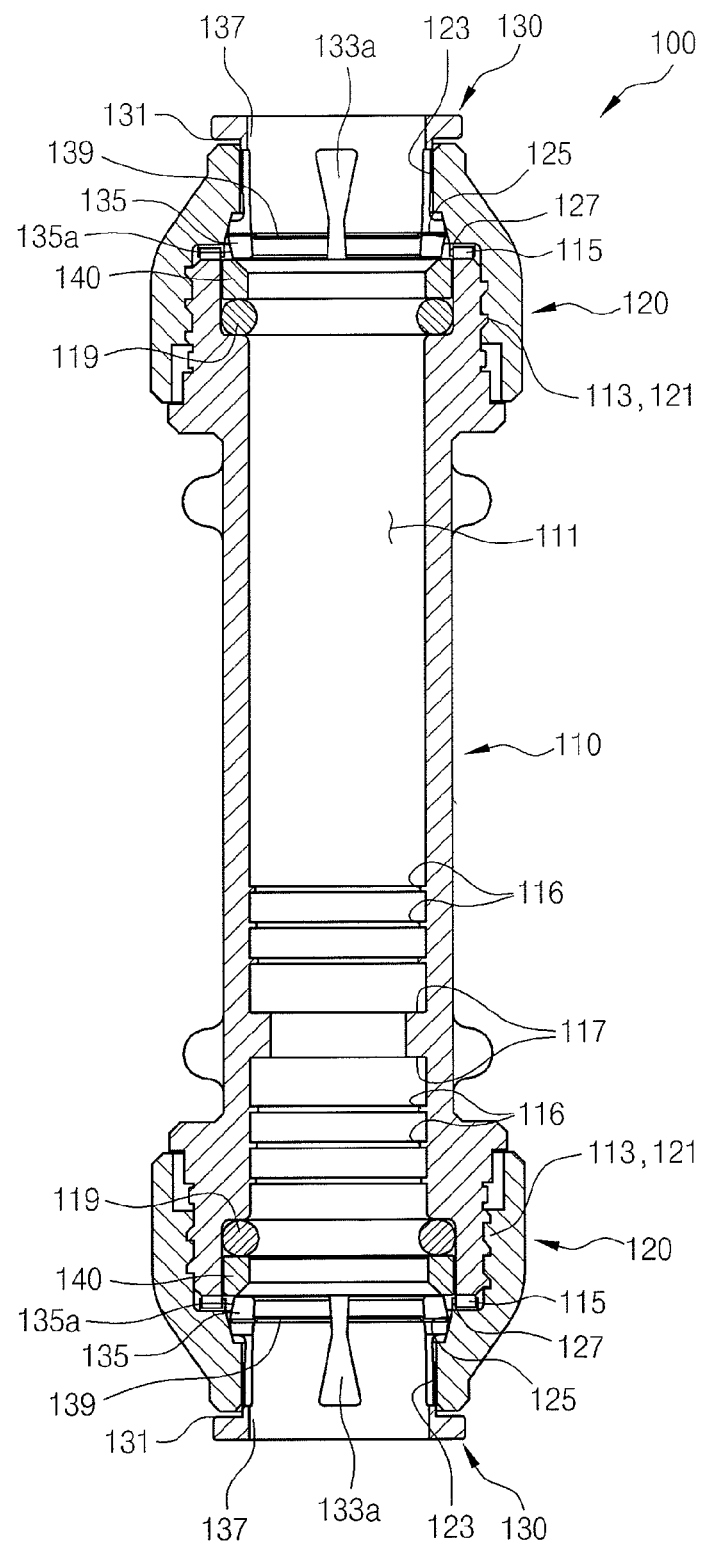
FIG. 6 is an assembled cross-sectional view illustrating the pipe coupling device of FIG. 2.
Figure 7:
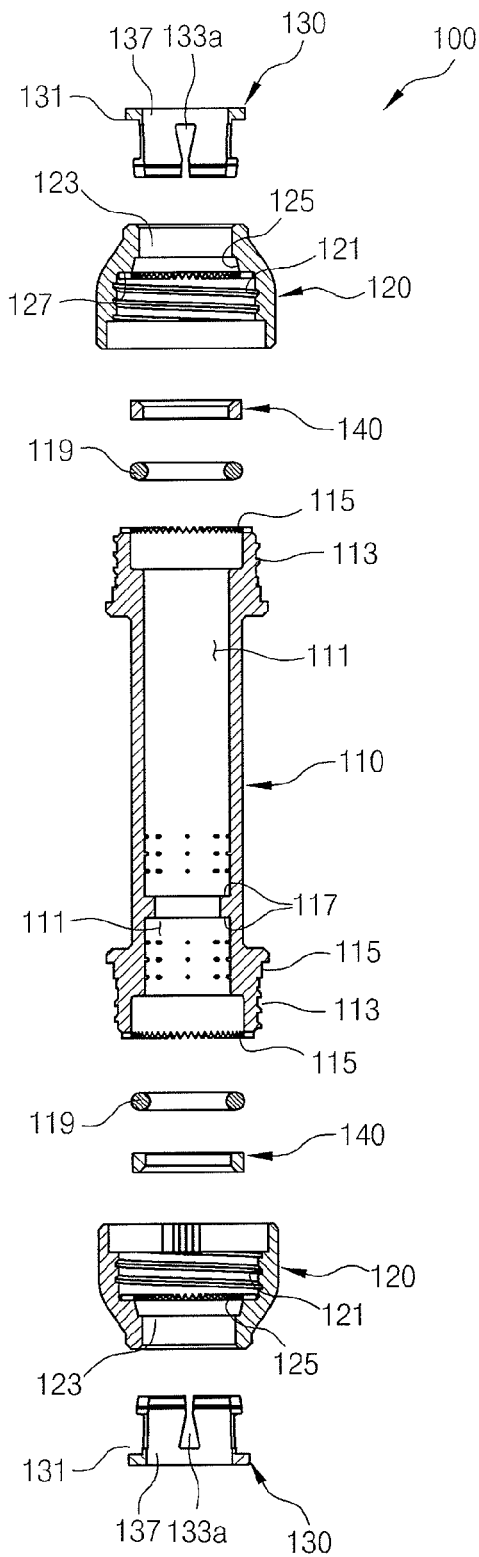
FIG. 7 is an exploded cross-sectional view illustrating the pipe coupling device of FIG. 2.
Figure 8:
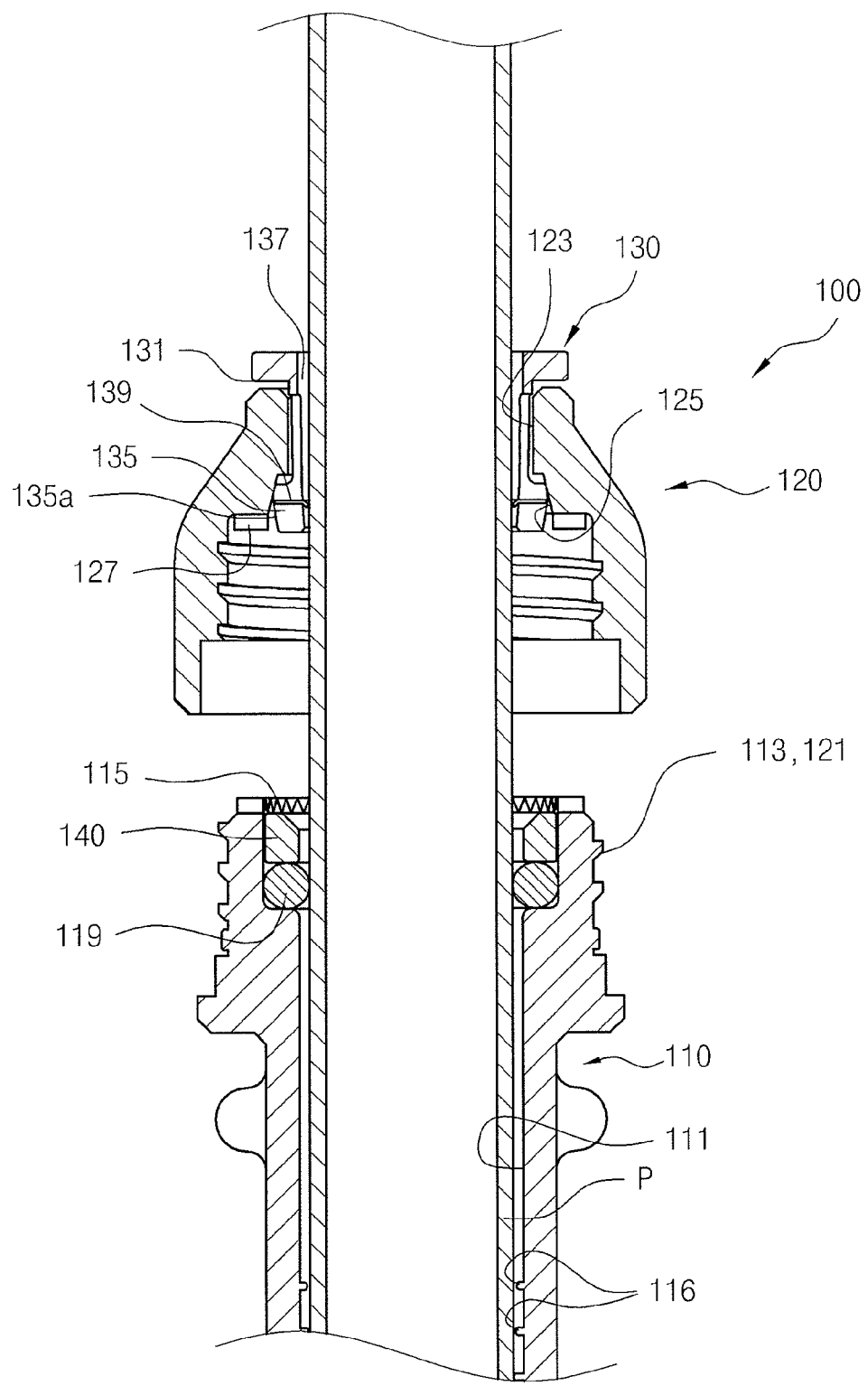
FIGS. 8 to 10 are cross-sectional views illustrating pipe coupling devices according to embodiments of the present invention.
Figure 9:
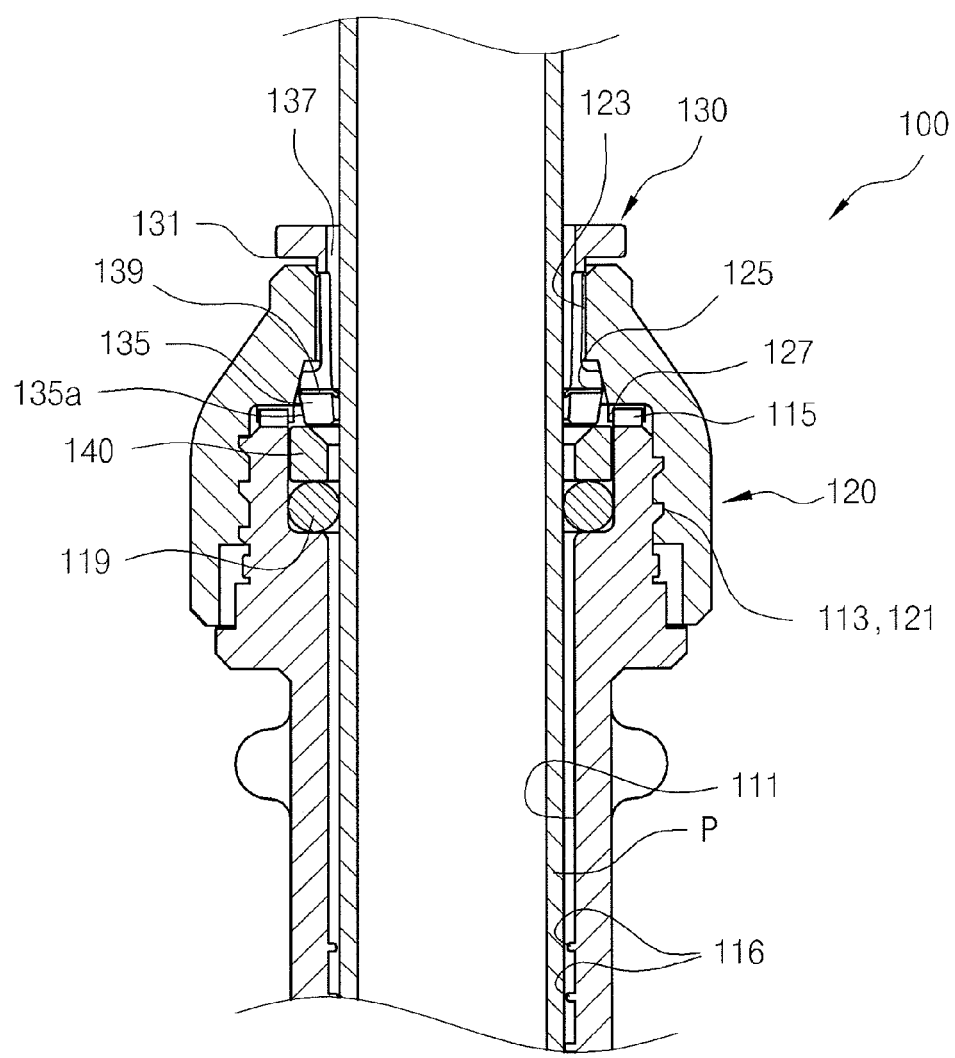
Figure 10:
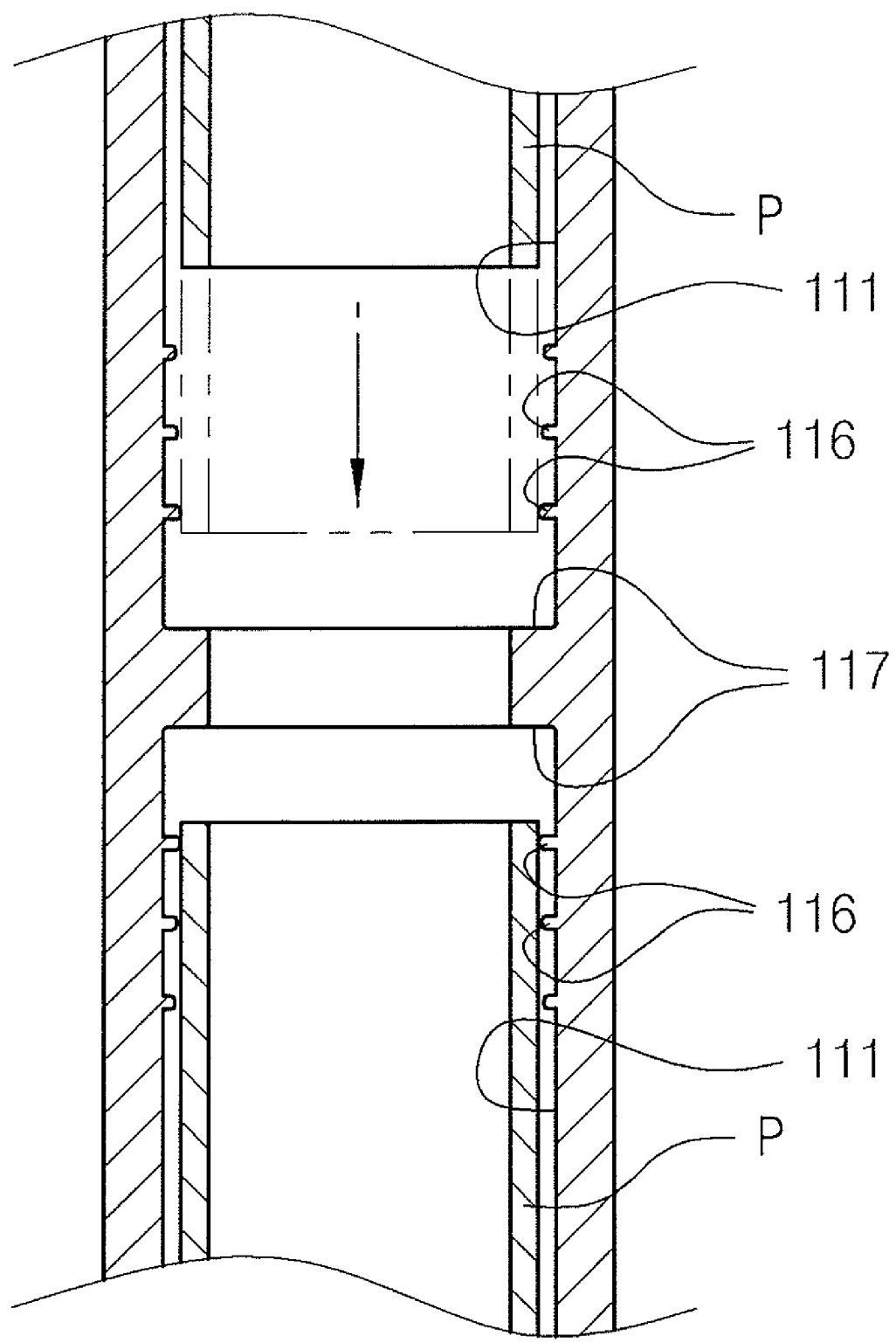
Figure 11:
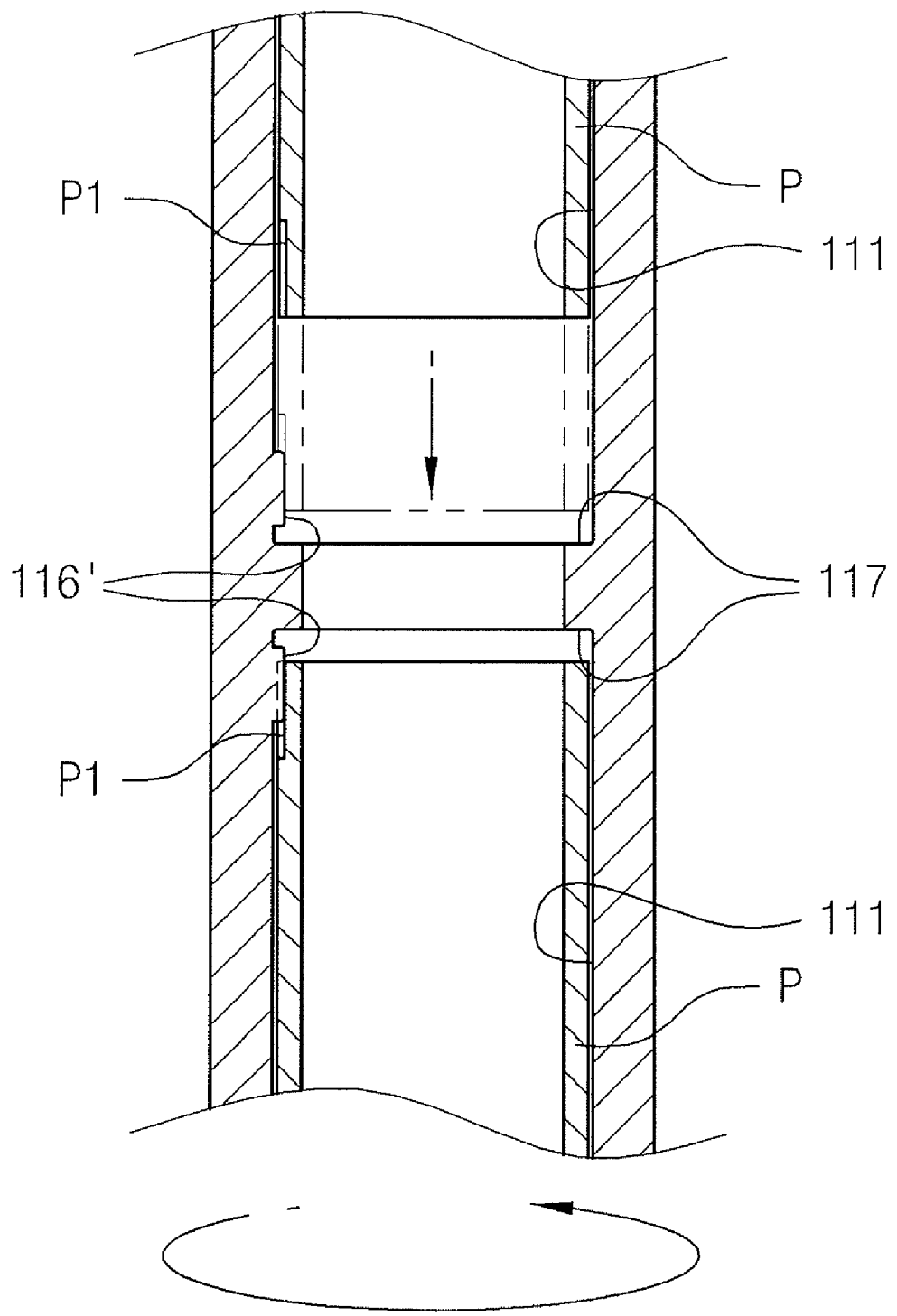
FIG. 11 is a cross-sectional view illustrating a pipe coupling device according to an embodiment of the present invention.
Figure 12:
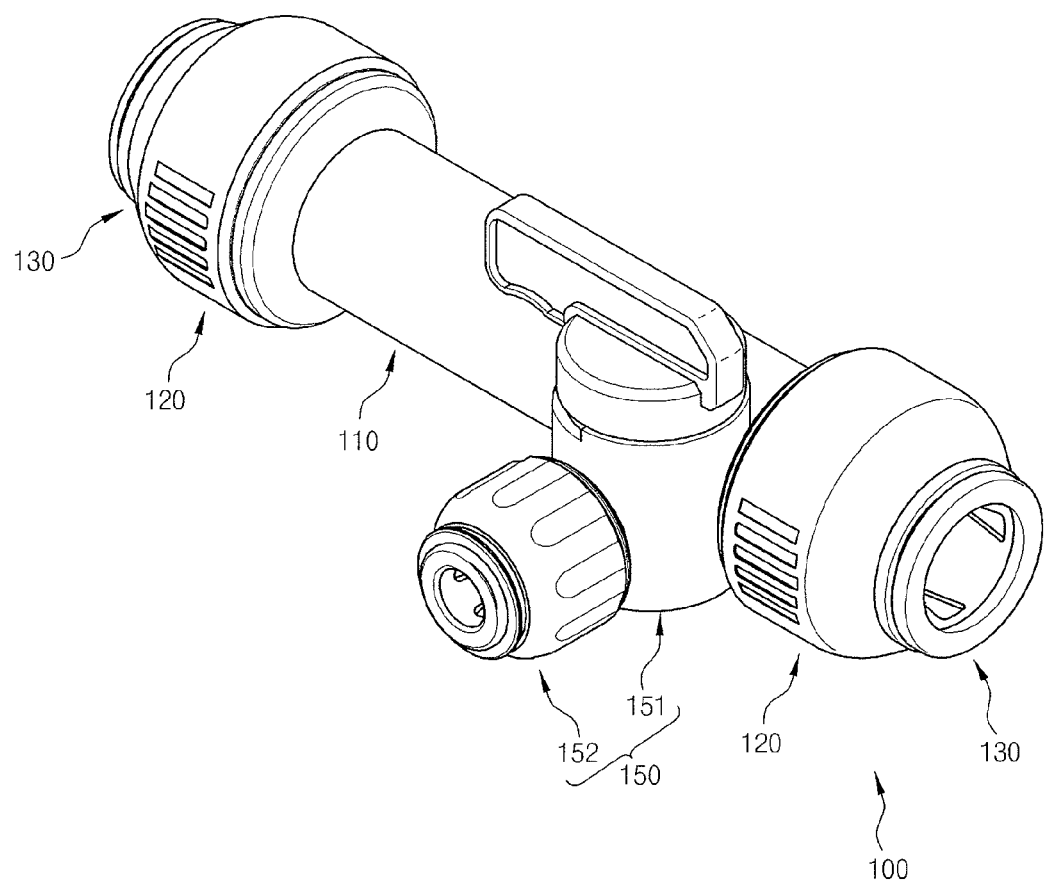
FIG. 12 is an assembled perspective view illustrating a pipe coupling device, which includes a branch part, according to an embodiment of the present invention.
Figure 13:
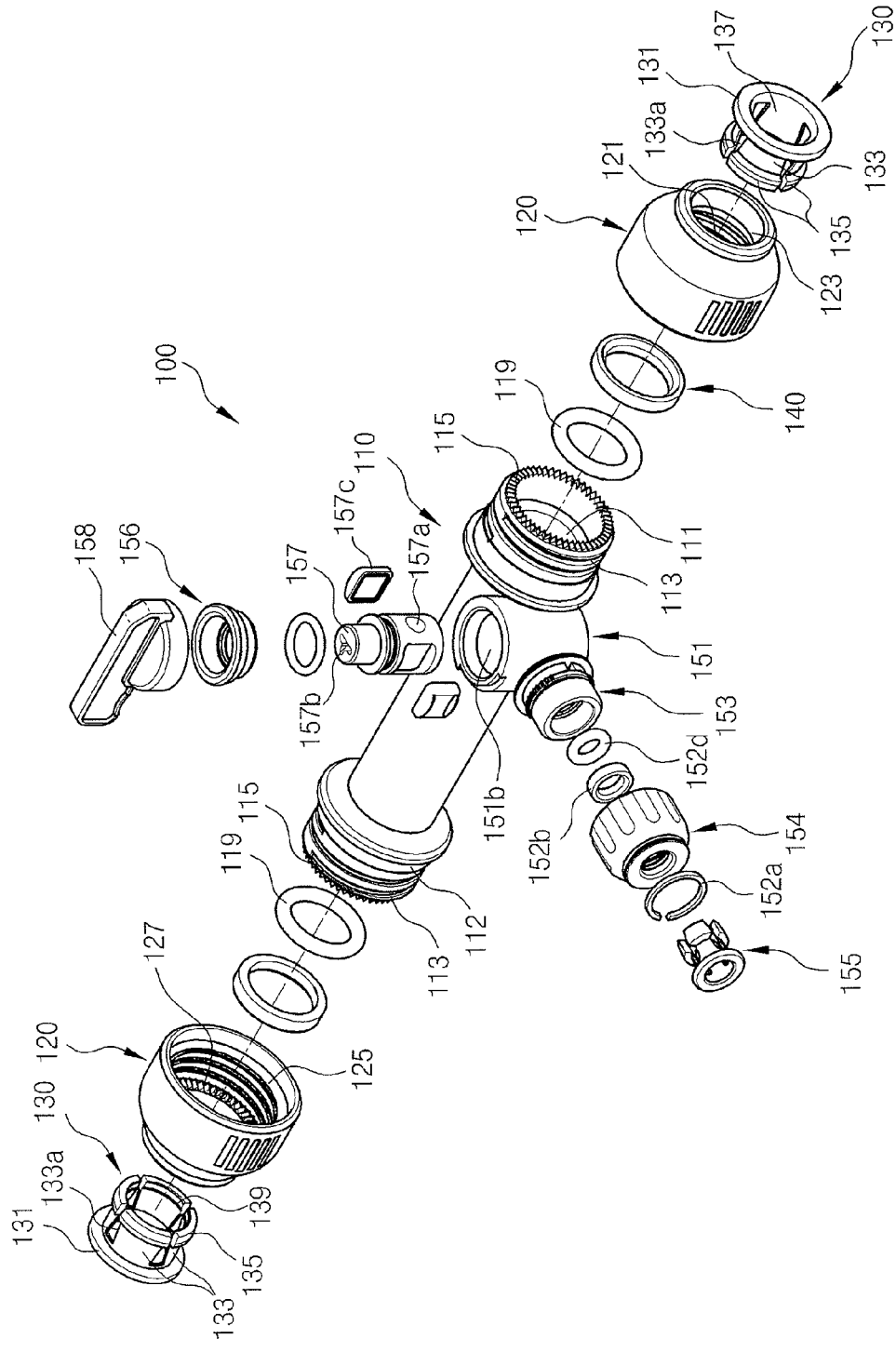
FIG. 13 is an exploded perspective view illustrating the pipe coupling device of FIG. 12.
Figure 14:
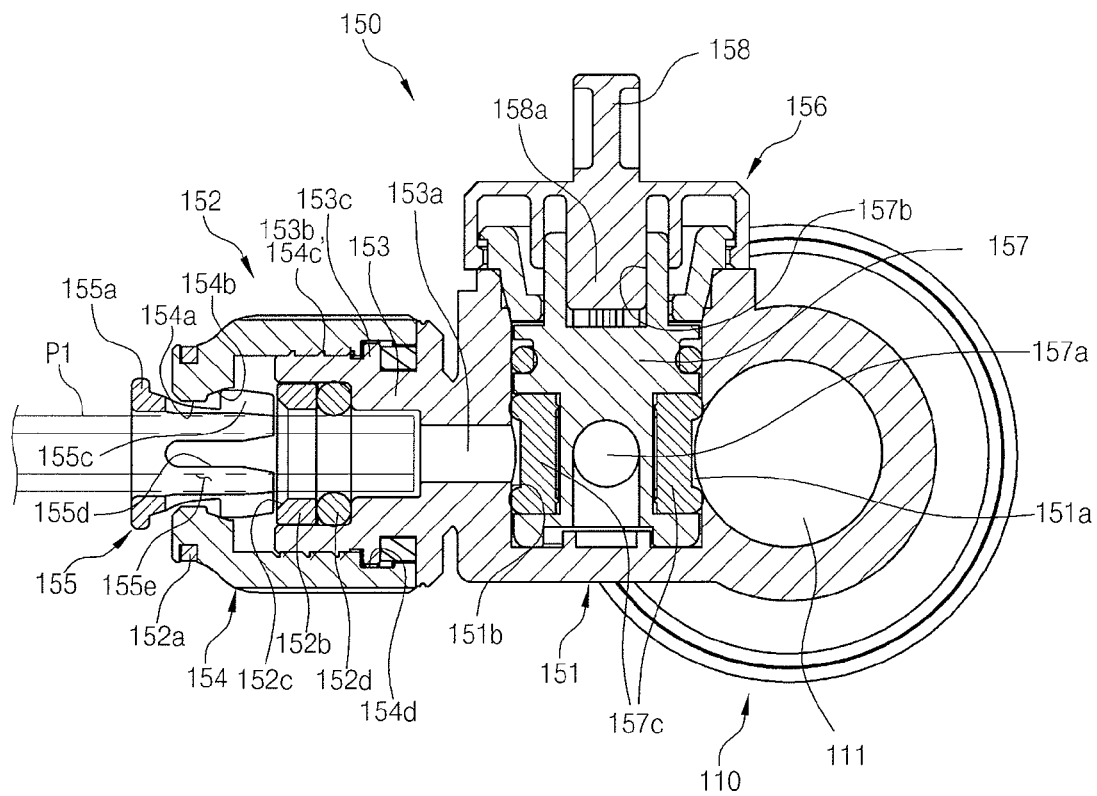
FIG. 14 is a cross-sectional view illustrating the pipe coupling device of FIG. 12.

FIG. 2 is an assembled perspective view illustrating a pipe coupling device according to an embodiment of the present invention, FIG. 3 is an exploded perspective view illustrating the pipe coupling device of FIG. 2, FIGS. 4 and 5 are cross-sectional views illustrating pipe coupling devices according to embodiments of the present invention, FIG. 6 is an assembled cross-sectional view illustrating the pipe coupling device of FIG. 2, FIG. 7 is an exploded cross-sectional view illustrating the pipe coupling device of FIG. 2, FIGS. 8 to 10 are cross-sectional views illustrating pipe coupling devices according to embodiments of the present invention, FIG. 11 is a cross-sectional view illustrating a pipe coupling device according to an embodiment of the present invention, FIG. 12 is an assembled perspective view illustrating a pipe coupling device, which includes a branch part, according to an embodiment of the present invention, FIG. 13 is an exploded perspective view illustrating the pipe coupling device of FIG. 12, and FIG. 14 is a cross-sectional view illustrating the pipe coupling device of FIG. 12.

First, as illustrated in FIGS. 2 to 10, the pipe coupling device 100 includes a body part 110 for coupling a pair of pipes P therein to allow the pipes P to be in communication with each other, fastening parts 120 fastened to both ends of the body part 110, and pressurizing parts 130 coupled to both ends of the body part 110 to elastically fix the outer circumferences of the pipes P.

A more detailed description of the pipe coupling device 100 will be provided hereinafter.

The body part 110 has an insertion hole 111, externally threaded portions 112, one or more identification protrusions 116, and first projections 115. Particularly, the insertion hole 111 is stepped several times in the middle portion of the inner surface of the body part 110. The identification protrusions 116 are formed on the inner circumference of the insertion hole 111 to identify the insertion depths of the pipes P. A stepped latching portion 117 is formed on the inner circumference of the insertion hole 111, into which the pipes P are inserted, to limit the insertion depths of the pipes P. The externally threaded portions 113 are formed on the outer circumference of both ends of the body part 110. The first projections 115 are continuously formed on the upper surfaces of the externally threaded portions 113.

The stepped portions of the insertion hole 111 have different diameters. Particularly, an O-ring 119 and a bush 140 are sequentially inserted into the stepped portion having the largest diameter. Each of the pipes P is inserted into one of the stepped portions having a smaller diameter.

In the case where a corroded or damaged portion of the pipe P has a width of 2-3 cm, it is preferred to cut a length of about 6-7 cm, including the periphery of the corroded or damaged portion.

It is preferred that the insertion hole 111 is deep enough to connect short pipes cut to remove even slightly corroded portions. Complete removal of corroded portions ensures improved installability.

As illustrated in FIGS. 4 and 5, the pipes P are inserted into the insertion hole 111 and are stopped by the stepped latching portion 117 formed on the inner circumference of the insertion hole 111. Particularly, the stepped latching portion 117 has different depths from both ends of the insertion hole 111. Due to the asymmetric location of the stepped latching portion 117, the insertion depths of the pipes P can be freely adjusted.

The pipes P, which are inserted into both ends of the pipe coupling device 100, may have different lengths because of different degrees of corrosion or damage in the pipes P before cutting. That is, the use of the pipe coupling device 100 facilitates the connection of pipes from which only small corroded or damaged portions are cut out. This demonstrates improved versatility of the pipe coupling device 100.

Alternatively, the stepped latching portion 117 may be positioned in the middle portion of the insertion hole 111.

At least one protrusion may be formed on the inner circumference of the insertion hole 111, into which the pipes P are inserted, to latch the ends of the pipes P. The identification protrusions 116 are formed to identify the insertion depths of the pipes P. The identification protrusions 116 may be formed radially or in a ring shape on the inner circumference of the insertion hole 111.

The identification protrusions 116 increase in height as they approach the stepped latching portion 117. That is, the distance between the identification protrusions 116 opposed to each other on the inner circumference of the insertion hole 111 gradually decreases with increasing insertion depth of the pipe P.

With this arrangement, the pipe P is sequentially latched by the identification protrusions 116 having different heights upon insertion. A worker can feel stepwise how deep the pipe P is inserted into the insertion hole 111. That is, the worker can conceive the insertion depth of the pipe P by tactile sensation.

As illustrated in FIG. 11, identification protrusions 116' are formed on the inner surface of the insertion hole 111 and may extend in the lengthwise direction of the body part 110. Latching grooves P1 are formed on the outer circumference of one distal end of each pipe P and are latched by the identification protrusions 116'.

Particularly, when the body part 110 is rotated after the pipes P are inserted through both ends of the insertion hole 111, the worker can know whether the latching grooves P1 are latched by the identification protrusions 116' by tactile sensation, and can determine whether the pipes P are located to close to the central portion of the body part 110.

That is to say, the identification protrusions 116 are formed on the inner circumference of the insertion hole 111 to estimate the insertion depths of the pipes P. The insertion depths of the pipes P can be estimated by tactile sensation. Symmetric lengths of the pipes P inserted into the pipe coupling device 100 ensure improved hermetic sealing and reduced fluid resistance.

Examples of suitable materials for the body part 110 include, but are not limited to, polypropylene (PP) and acetal resins.

A plurality of latching pieces (not shown) are formed on the outer circumference of the body part 110 to facilitate the coupling of the pipes P.

Each of the fastening parts 120 has an internally threaded portion 121, a coupling hole 123, a first inclined plane 125 and second projections 127. Particularly, the internally threaded portion 121 is formed on the inner circumference of the fastening part 120 and is screwed onto the externally threaded portion 113. The coupling hole 123 penetrates to be in communication with the internally threaded portion 121. The first inclined plane 125 is formed around the boundary between the internally threaded portion 121 and the coupling hole 123. The second projections 127 are continuously formed on the lower surface of the first inclined plane 125. The second projections 127 pressurize the first projections 115 and are engaged with the first projections 115 when the fastening part 120 is fastened to the body part 110.

The first inclined plane 125 is widened and inclined toward the internally threaded portion 121. This structure is advantage in pressurizing the outer circumferential surface of a pressurizing piece 133.

The first projections 115 of the body part 110 and the second projections 127 of the fastening part 120 may be polygonal, for example, regular triangular or right-angled triangular, or semi-arc in cross section. It is preferred that the first projections 115 and the second projections 127 are formed like saw-teeth symmetrically to each other.

The pressurization of the first projections 115 by the second projections 127 and the engagement of the second projections 127 with the first projections 115 indicate the time when the fastening of the fastening parts 120 to the body part 110 is finished. This indication prevents the occurrence of errors when the fastening parts 120 are fastened to the body part 110 to protect the fastened portions from damage, which is desirable in terms of maintenance and repair.

A plurality of grooves (not shown) or protrusions (not shown) are formed on the outer circumference of the fastening part 120 to facilitate coupling of the pipes P.

There is no particular restriction as to the material for the fastening parts 120. The fastening parts 120 are preferably made of an engineering plastic. Such engineering plastics have high strength and elasticity, are highly resistant to impact, wear, heat, cold, chemicals and fatigue, and exhibit high electrical insulation, compared to general plastics.

Specifically, the fastening parts 120 are made of at least one engineering plastic selected from the group consisting of polyamide, polyester, polycarbonate, polybutylene terephthalate (PBT), and polyphenylene oxide (PPO).

The fastening parts 120 are advantageous in terms of strength, elasticity, hardness, elongation, density and moldability on account of the characteristics of their material. Due to these advantages, the fastening parts 120 are protected from deformation by heat transferred through the pipes P and are prevented from decoupling by internal and external factors. The fastening parts 120 possess strength comparable to metals and can be manufactured in an easy and economical manner. In addition, the fastening parts 120 have advantages in terms of maintenance and repair.

Each of the pressurizing parts 130 has a stepped foot portion 131, a pressurizing piece 133, cut-away grooves 133a, a stepped latching portion 135 and a pressurizing space 137. Particularly, the stepped foot portion 131 is formed on the outer circumference of one side of the pressurizing part so as to be introduced into the coupling hole 123. The pressurizing piece 133 is integrated with the stepped foot portion 131. The stepped latching portion 135 is formed on the outer circumference of the other side of the pressurizing part. The cut-away grooves 133a are formed on the outer circumferential surface of the pressurizing piece 133 to elastically widen the pressurizing piece 133. The pressurizing space 137 is formed in the central portion of the pressurizing part 130. Due to this construction, the first inclined plane 125 of the fastening part 120 fastened to the body part 110 pressurizes the outer circumferential surface of the stepped latching portion 135, or the outer circumference of the stepped latching portion 135 is moved inward along the first inclined plane 125 and the pressurizing piece 133 shrinks inward to pressurize the outer circumference of the pipe inserted into the pressurizing space 137 when the pipe P inserted into the pressurizing space 130 is withdrawn.

The cut-away grooves 133a are formed at regular intervals on the outer circumference of the pressurizing piece 133. The number of the pressurizing piece 133 can be determined by the intervals and number of the cut-away grooves 133a. The stepped latching portion 135 protrudes from the outer circumference of the distal end of the pressurizing piece 133.

Heat from the pipes P may melt the O-rings 119. In this case, the bushes 140 serve to prevent the molten O-rings 119 from entering the pressurizing parts 130.

Clamping pieces 139 are formed on the inner circumference of the pressurizing piece 133. The clamping pieces 132 and the pressurizing piece 133 are integrally formed by injection molding. The clamping pieces 139 protrude from the inner circumference of the pressurizing piece 133. The clamping pieces 139 bite into the outer circumference of the pipe P when the pressurizing piece 133 pressurizes the outer circumference of the pipe P. There is no particular limitation as to the material for the clamping pieces 139. The clamping pieces 139 are preferably made of metal having a higher strength than the material for the pipes P for easy biting into the outer circumference of the pipes P.

The clamping pieces 139 biting into the outer circumference of the pipes P prevent the pipes P from withdrawing from the pipe coupling device 100, improving the coupling between the pipes P via the pipe coupling device 100.

Further, the protruding portions of the clamping pieces 139 may be bent in the insertion direction of the pipe P. This bending concentrates the biting force of the clamping pieces 139 in the withdrawal direction of the pipe P, making it more difficult for the pipe P to withdraw from the pipe coupling device 100.

The operations and functions of the present invention will now be explained below.

Pipes P can be joined and connected to each other through the pipe coupling device 100 by the following process.

The O-rings 119 are accommodated within the insertion hole 111 of the body part 110 and the fastening parts 120, to which the pressurizing parts 130 is mounted, are fastened to the body part 110.

The first projections 115 inclined in a direction opposite to the fastening direction of each of the fastening parts 120 pass through the first inclined plane 125 and are fastened to the second projections 127 inclined in the fastening direction of the fastening part 120.

The second projections 127 formed within each of the fastening parts 120 pressurize the first projections 115 formed on the upper surface of the body part 110 and are engaged with the first projections 115. The pressurization and engagement indicate the time when the fastening of the fastening parts 120 to the body part 110 is finished to protect the fastened portions from damage.

When the first inclined plane 125 of each of the fastening parts 120 fastened to the body part 110 pressurizes the outer circumferential surface of the pressurizing piece 133, the pressurizing piece 133 shrinks inward to pressurize the outer circumference of the pipe inserted into the pressurizing space 137.

When the pressurizing piece 133 pressurizes the outer circumference of the pipe P, the clamping pieces 139 bite into the outer circumference of the pipe P. This biting prevents the pipes P from withdrawing from the pipe coupling device 100.

The pipe P is sequentially latched by the identification protrusions 116 to having different heights upon insertion. A worker can feel stepwise how deep the pipe P is inserted into the insertion hole 111 and can thus conceive the insertion depth of the pipe P by tactile sensation.

When the body part 110 is rotated after the pipes P are inserted through both ends of the insertion hole 111, the worker can know whether the latching grooves P1 are latched by the identification protrusions 116' by tactile sensation, and can determine whether the pipes P are located close to the central portion of the body part 110.

FIGS. 12 to 14 illustrate a pipe coupling device 100, including a branch part 150, according to an embodiment of the present invention. As illustrated in FIGS. 12 to 14, the body part 110 is integrated with the branch part 150 on the outer circumference thereof.

The branch part 150 includes a branch member 151, connection means 152 and a branch valve 156.

The branch member 151 has an introduction hole 151a uprightly communicating with the insertion hole 111, and a branch hole 151b vertically communicating with the introduction hole 151a and being opened upward.

The branch member 151 is integrated with the connection means 152 at the lateral side thereof. The connection means 152 is in communication with the introduction hole 151a. The branch valve 156 is turnably accommodated in the branch member 151. That is, a fluid may flow into the connection means 152 through the insertion hole 111 or may be blocked depending on the turning angle of the branch valve 156.

The connection means 152 includes a connection member 153, a cover 154 and a pressurizing part 155. The connection member 153 has a through-hole 153a penetrating the central portion thereof while being in communication with the introduction hole 151a.

The cover 154 has a coupling hole 154a penetrating the central portion thereof and a third inclined plane 154b formed on the inner circumference thereof. A screw 153b is fastened to the outer circumference of the connection member 153.

The pressurizing part 155 has a stepped foot portion 155a formed on the outer circumference of one side thereof so as to be partially introduced into the coupling hole 154a. A pressurizing piece 155b is formed integrally with the stepped foot portion 155a. The stepped latching portion 155c is formed on the outer circumference of the other side of the pressurizing part 155. A plurality of cut-away grooves 155d are formed on the outer circumferential surface of the pressurizing piece 155b to elastically widen the pressurizing piece 155b.

A pressurizing space 155e is formed in the central portion of the pressurizing part 155.

When the third inclined plane 154b of the cover 154 fastened to the connection member 153 pressurizes the outer circumferential surface of the stepped latching portion 155c, the pressurizing piece 155b shrinks inward to pressurize the outer circumference of a branch pipe P1 inserted into the pressurizing space 155e.

Particularly, the screw 153b is formed on the outer circumference of one end of the connection member 153. A plurality of latch protrusions 153c are continuously formed in the rear of the screw 153b on the outer circumference of the connection member 153. Internally threaded portions 154c and 153b are formed on the inner circumference of the cover 154 and are fastened to the screw 153b. A plurality of fixing protrusions 154d are formed on the inner circumference of the cover 154. Due to this structure, when the pressurizing part 155 is fastened to the connection member 153, the fixing protrusions 154d are pressurized by and engaged with the latch protrusions 153c, thus maintaining hermetic coupling.

A bush 152b, which has a fourth inclined plane 152 formed at an inner stepped portion thereof, is inserted into the through-hole 153a to simultaneously pressurize an O-ring 152d and the outer circumference of the branch pipe P1. The clearance of the pressurizing part can also be controlled by the bush 152b.

A specification identification ring 152a having various colors is selectively fitted on the outer circumference of the cover 154 to visually discern the specified dimension of the branch pipe P1 by colors.

The branch valve 156 includes a turnable flange 157 and a switch 158. The flange 157 is turnably accommodated in the branch hole 151b and allows the insertion hole 111 to be in communication with the connection means 152 depending on the turning angle of a transversely penetrating drainage hole 157a.

The switch 158 is coupled to the upper end of the turnable flange 157 to manipulate the turnable flange 157.

Packing members 157c are coupled to both lateral sides of the turnable flange 157 to improve the hermetic sealing of the turnable flange 157. A fitting protrusion 158a formed under the switch 158 is fitted into a fitting groove 157b formed at the upper surface of the turnable flange 157, so that the drainage hole 157a and the turnable flange 157 can be turned in conjunction with the turning of the switch 158.

The coupling of the branch part 150 to the body part 110 allows for selective coupling of the branch pipe P1, so that a flow of fluid can be freely branched or blocked, ensuring ease of installation.

As is apparent from the above description, since the insertion hole is formed deep, the pipe coupling device provides a sufficient coupling depth to connect pipes, from which even slightly corroded portions are removed, so that the pipes can be connected to each other in a state in which corroded portions are completely removed from the pipes, thus ensuring improved installability.

The stepped latching portion formed on the inner circumference of the insertion hole has different depths from both ends of the insertion hole. Therefore, the pipe coupling device provides different insertion depths to connect pipes, from which corroded or damaged portions are cut out, so that the pipes can be connected to each other even when only small portions are cut out from the pipes, thus ensuring improved versatility.

The identification protrusions are formed on the inner circumference of the insertion hole to identify the insertion depths of pipes. Therefore, the pipe coupling device allows a worker to conceive the insertion depths of pipes by tactile sensation to make the insertion lengths of the pipes symmetric, thus ensuring improved hermetic sealing and reduced fluid resistance.

The second projections formed within each of the fastening parts pressurize the first projections formed on the upper surface of the body part and are engaged with the first projections. Therefore, the pipe coupling device indicates the time when the fastening of the fastening parts is finished to prevent the occurrence of errors when fastening.

The branch part is coupled to the body part to allow for selective coupling of the branch pipe. Therefore, the pipe coupling device freely branch or block a flow of fluid, thus ensuring ease of installation.

The fastening parts are made of an engineering plastic that is highly resistant to heat, impact and wear. Therefore, the fastening parts possess strength comparable to metals and can be manufactured in an easy and economical manner. In addition, the pipe coupling device can use cheap materials comparable to metals in terms of durability and heat resistance to prevent the fastening parts from decoupling by internal and external factors.

Although the present invention has been described herein with reference to the foregoing embodiments and accompanying drawings, the scope of the present invention is not limited to the embodiments. Therefore, it will be evident to those skilled in the art that various substitutions, modifications and changes are possible, without departing from the spirit of the invention as disclosed in the accompanying claims.

What is claimed is:

1. A pipe coupling device comprising a body part, fastening parts, and pressurizing parts wherein the body part has a multi-stepped insertion hole penetrating the central portion thereof, a stepped latching portion formed on the inner circumference of the insertion hole to limit the insertion depths of pipes, externally threaded portions formed on the outer circumference of both ends thereof, and first projections continuously formed on the upper surfaces of the externally threaded portions; each of the fastening parts has an internally threaded portion formed on the inner circumference thereof and is screwed onto the externally threaded portion, a coupling hole penetrating the fastening part so as to be in communication with the internally threaded portion, a first inclined plane formed around the boundary between the internally threaded portion and the coupling hole, and second projections continuously formed on the lower surface of the first inclined plane to pressurize the first projections and to be engaged with the first projections when the fastening part is fastened to the body part; and each of the pressurizing parts has a stepped foot portion formed on the outer circumference of one side thereof so as to be introduced into the coupling hole, a pressurizing piece integrated with the stepped foot portion, a stepped latching portion formed on the outer circumference of the other side thereof, cut-away grooves formed on the outer circumferential surface of the pressurizing piece to elastically widen the pressurizing piece, and a pressurizing space formed in the central portion thereof, so that the first inclined plane of the fastening part fastened to the body part pressurizes the outer circumferential surface of the stepped latching portion, or the outer circumference of the stepped latching portion is moved inward along the first inclined plane and the pressurizing piece shrinks inward to pressurize the outer circumference of the pipe inserted into the pressurizing space when the pipe inserted into the pressurizing space is withdrawn, wherein the body part further has identification protrusions formed on the inner circumference of the insertion hole and stopping the ends of the pipes to identify the insertion depths of the pipes and the identification protrusions are formed radially on the inner circumference of the insertion hole and increase in height as they approach the central portion of the body part.

2. The pipe coupling device of claim 1, wherein the stepped latching portion is located with different depths from both ends of the insertion hole.

3. The pipe coupling device of claim 1, wherein the identification protrusions are formed on the inner circumference of the insertion hole and extend in the lengthwise direction of the body part so that latching grooves formed on the outer circumference of the pipe are latched by the identification protrusions upon rotation.

4. The pipe coupling device of claim 1, wherein the first projections and the second projections are formed like saw-teeth symmetrically to each other.

5. The pipe coupling device of claim 1, further comprising a branch part integrated with the body part on the outer circumference of the body part wherein the branch part comprises: a branch member having an introduction hole uprightly communicating with the insertion hole, and a branch hole vertically communicating with the introduction hole and being opened upward;

connection means integrated with the branch member at the lateral side of the branch member and in communication with the introduction hole; and a branch valve turnably accommodated in the branch member to branch or block a flow of fluid into the connection means through the insertion hole depending on the to turning angle thereof.

6. The pipe coupling device of claim 5, wherein the connection means comprises: a connection member having a through-hole penetrating the central portion thereof while being in communication with the introduction hole; a cover having a coupling hole penetrating the central portion thereof and a third inclined plane formed on the inner circumference thereof; and a pressurizing part having a stepped foot portion formed on the outer circumference of one side thereof so as to be partially introduced into the coupling hole, a pressurizing piece formed integrally with the stepped foot portion, a stepped latching portion formed on the outer circumference of the other side thereof, a plurality of cut-away grooves formed on the outer circumferential surface of the pressurizing piece to elastically widen the pressurizing piece, and a pressurizing space formed in the central portion thereof, so that when the third inclined plane of the cover fastened to the connection member pressurizes the outer circumferential surface of the stepped latching portion, the pressurizing piece shrinks inward to pressurize the outer circumference of a branch pipe inserted into the pressurizing space, and the branch valve comprises a flange turnably accommodated in the branch hole and allowing the insertion hole to be in communication with the connection means depending on the turning angle of a transversely penetrating drainage hole; and a switch coupled to the upper end of the turnable flange to manipulate the turnable flange.

7. The pipe coupling device of claim 1, wherein the fastening parts are made of at least one polymer selected from the group consisting of polyamide, to polyester, polycarbonate, polybutylene terephthalate (PBT), and polyphenylene oxide (PPO).

* * * * *